United States Patent [19]

Elste, Jr.

[11] 3,867,162
[45] Feb. 18, 1975

[54] BITUMINOUS EMULSIONS USEFUL WITH MIXTURES OF SILICEOUS AND LIMESTONE AGGREGATE

[75] Inventor: Edward G. Elste, Jr., Lutherville, Md.

[73] Assignee: Chevron Research Company, San Francisco, Calif.

[22] Filed: Dec. 17, 1970

[21] Appl. No.: 99,259

[52] U.S. Cl............ 106/277, 106/281 R, 106/283, 252/311.5, 117/168
[51] Int. Cl...... C08h 13/00, C08k 1/62, C09d 3/24
[58] Field of Search........................... 106/273–284; 94/20; 252/311.5; 117/168

[56] References Cited
UNITED STATES PATENTS

| 3,236,671 | 2/1966 | Dybalski et al.......... | 106/277 |
|---|---|---|---|
| 3,257,231 | 6/1966 | McEachran.............. | 106/277 X |
| 3,305,379 | 2/1967 | Ferm...................... | 106/277 |
| 3,422,026 | 1/1969 | Wright.................... | 106/277 X |

Primary Examiner—Joan E. Welcome
Attorney, Agent, or Firm—G. F. Magdeburger; C. J. Tonken; B. G. Fehringer

[57] ABSTRACT

Bituminous emulsions are provided which develop good adhesion with either calcium-based aggregates or siliceous-based aggregates or mixtures thereof. The base emulsions useful in this invention are comprised of (1) bitumen, (2) a cationic emulsifier, (3) acid, and (4) water. To this base emulsion is added (1) an adhesion promoter such as tall oil, and (2) a hydrocarbon solvent to form the finished modified emulsions.

11 Claims, No Drawings

3,867,162

BITUMINOUS EMULSIONS USEFUL WITH MIXTURES OF SILICEOUS AND LIMESTONE AGGREGATE

BACKGROUND OF THE INVENTION

1. Field of the Invention

In many areas of the United States and throughout the world, the aggregate available for road, construction and the like, is very limited. Some areas have no aggregate at all, while in others, the only aggregate available is a mixture of (1) limestone and other calcium-containing materials and (2) siliceous materials.

Asphalt emulsions used in combination with aggregates generally have a limited range of utility. Any given emulsion is frequently suitable only for use with a particular type of aggregate.

The major factors affecting adhesion are (1) the nature of the emulsion, i.e., whether it is anionic or cationic, and (2) the nature of the aggregate, i.e., whether it is a limestone or other calcium-based aggregate or whether it is siliceous in nature.

Molecules on the surface of calcium-based aggregates - such as limestone - will dissociate in the presence of water, thereby acquiring an electropositive surface charge. Conversely, siliceous aggregates acquire electronegative surface charges when contacted with water.

Historically, poor adhesive characteristics are developed when anionic asphalt emulsions are used with siliceous aggregates. Similarly, but to a lesser degree, cationic bituminous emulsions develop poorer adhesion characteristics when used with aggregate having an electropositive surface charge, i.e., calcium-containing aggregates.

Attempts to develop bituminous emulsions have in the past generally been limited to development of emulsifiers which allow a bituminous emulsion to work well with a specific type of aggregate. Some attempts have been made to develop emulsions which will work with either siliceous or calcium-based aggregates. These attempts have had mixed results - the problem continues to exist.

The problem encountered is compounded when the only aggregate available is a mixture of siliceous material and calcium-containing material. Southern Alabama is an example of one area in which the only aggregate available in reasonable quantities is of this nature. Attempts to develop a bituminous emulsion which will work with this mixture have had limited success.

This invention then directed to the preparation of a bituminous emulsion which will give good adhesion with (1) either calcium-based aggregates or siliceous aggregates and, more particularly, with the difficult problem of (2) mixtures in all proportions of the two types of aggregates.

2. Description of the Prior Art

U.S. Pat. No. 2,886,438 discusses the problem of coating siliceous or calcareous materials with the same emulsions and discloses a cationic emulsion which is purported to work perfectly with either dirty siliceous or calcareous materials.

U.S. Pat. No. 3,230,104 discusses the problem encountered in attempting to coat electropositive- or electronegative-charged aggregates and discloses an emulsion described as capable of forming good adhesion with either form of aggregate.

U.S. Pat. No. 3,434,856 describes at Column 3, Lines 27 through 38, a cationic emulsion comprised of about 65 percent asphalt residue, emulsified in water with about 0.5 percent of an n-$C_{14-18}$-alkyl trimethylammonium chloride and which contains 0.22 percent of n-tall oil, 1,3-propylene diamine and 0.44 percent of p-phenylene diamine.

SUMMARY OF THE INVENTION

Bituminous emulsions are provided which develop good adhesion with either calcium-based aggregates or siliceous-based aggregates or mixtures thereof.

The base emulsions useful in this invention are comprised of (1) bitumen, (2) a cationic emulsifier, (3) acid and (4) water. To this base emulsion is added (1) an adhesion promoter such as tall oil, and (2) a hydrocarbon solvent to form the finished modified emulsions.

DETAILED DESCRIPTION OF THE INVENTION

The base emulsions of this invention are prepared by blending (1) from about 50 to about 80 parts preferably from 55 to 70 parts by weight bitumen with (2) from 0.05 to about 2.0 parts by weight of a cationic emulsifier, and (3) from 0 to about 0.5 parts by weight acid, the balance to make 100 parts by weight being water. Standard emulsion manufacturing procedures are employed.

To form the modified emulsions of the subject invention, the base emulsion is blended with an adhesion promoter preferably mixed with a solvent. To from about 60 to about 100 parts of the base emulsion is added with blending from about 0.25 to about 3.0 parts, preferably from about 0.5 to 2, of an adhesion promoter in from 0 to about 30 parts, preferably from about 10 to about 20, by weight solvent.

PREPARATION OF BASE EMULSIONS

The base emulsions of the subject invention are prepared utilizing standard manufacture procedure by emulsifying bitumen with an aqueous phase to which has preferably been added the cationic emulsifier and the acid, if present. The bitumen temperature may range from about 150° to 300°F. The emulsifying water temperature may range from about 60° to about 180°F, more usually from about 90° to about 120°F. Typically a colloid mill is utilized although other equipment such as homogenizers and high shear mixers may also be used.

PREPARATION OF MODIFIED EMULSIONS

The modified emulsions of this invention are prepared by (1) blending the adhesion promoter with the volatile solvent (if used) and (2) blending the base emulsion with the mixture of (1) above until a uniform product is obtained. The (1) adhesion agent in the solvent is blended with the (2) base emulsion with both components at a temperature in the range of from 60° to 180°F. If no solvent is used, the adhesion agent is heated to 140° to 180°F. and slowly added to the base emulsion. In either case, simple mixing with stirring in a continuous or batch process is satisfactory.

Adhesion Promoter

The preferred adhesion agent useful in this invention is tall oil. Tall oil is a generic term describing a family of products.

The primary source of tall oil is from pine trees. Besides cellulose, tall oil contains fatty acids, esters, rosin acids, sterols, terpenes, carbohydrates and lignin. These are separated when wood is converted to paper pulp by the sulfide or Kraft process. The acids are neutralized in an alkaline digestion liquor. The mixture of rosin and fatty acid soap are recovered. Subsequent acidification releases free rosin and fatty acids, the major constituents of tall oil. See Kirk-Othmer, Encyclopedia of Chemical Technology, Vol. 13, (1954).

Particularly preferred tall oils for use in this invention contain from about 10 to about 30 percent by weight rosin acid.

A specific example of a satisfactory adhesion agent is Crofatol P (a product of Crosby Chemical, Inc.), which is tall oil heads having a rosin acid content of 1 percent by weight, 86 percent by weight fatty acid, a saponification number of 180, an acid number of 178, and an unsaponifiables content of 13 percent by weight.

Another specific example of a preferred tall oil product useful in this invention is "Specialty AK" (a product of West Virginia Pulp & Paper), which is a reconstituted crude tall oil having an acid number of 80, a rosin acid content of 24 percent by weight, 25 percent by weight unsaponifiables and a saponification number of 122.

Other examples of useful tall oils are shown in Table I below:

TABLE I

|  | Unitol OT (Product of Union-Camp Co.) | Unitol CX | Acintol 1112 (Product of Arizona Chem) | Acintol D29LR |
|---|---|---|---|---|
| Fatty Heads, % by wt. | 68 | 69 | 82.9 | 68.8 |
| Rosin Heads, % by wt. | 2 | 15 | 0.5 | 29.0 |
| Unsaponifiables, % by wt. | 30 | 16 | 16.5 | 2.2 |
| Acid Number | 140 | 125 | 167 | 190 |
| Saponification Number | 148 | 150 | 168 | 194 |

Other tall oil products may also be used such as crude tall oil, tall oil heads and tall oil pitch.

Other high molecular weight weak acids, such as abietic, neoabietic, phenolic and naphthenic acids, which are highly oil soluble may also be used.

Emulsifiers

The emulsifiers useful in this invention are cationic active materials capable of emulsifying asphalt.

Suitable materials include salts of primary aliphatic amines known in the trade under the trademark designation of "Armeens" and quaternary ammonium salts such as N-alkyl benzyl-N,N,N-trimethyl ammonium chloride and N-alkyl benzyl N,N-diethyl-N-ethanolamine chloride (known in the trade as ATM-50 and ADE-50 respectively).

Polyethoxylated quaternary ammonium salts formed by addition of methyl chloride to polyoxyethylated aliphatic amines may also be used. The alphatic chain may be derived from long chain fatty acids such as oleic, stearic or cocoa fatty acids. From 2 to 50 moles of ethylene oxide are normally combined with each mole of fatty amine.

The various alkyl trimethyl ammonium chlorides and bromides obtained by acidification of corresponding quaternary bases are also satisfactory. (These compounds are sold in the trade under the trademark designation of "Arquads.") Examples of these are "Arquad T" and "Arquad S," derived from tallow and soybean oil, respectively.

The polyethoxylated quaternary ammonium salts are the preferred emulsifiers. A specific example of a preferred emulsifier is Ethoquad 0/12, a product of the Armour Company, having the formula

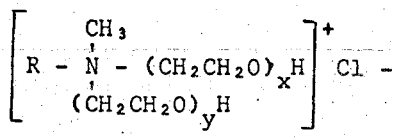

wherein R is an alkyl chain derived from oleic acid, $x$ = a whole number from 0–2, and $y$ = a whole number from 0–2, with the proviso that $y = 2-x$. Redicote E–11, an ethyoxylated diamine, a product of the Armour Company, is also a preferred emulsifier.

In general, highly polar and relatively more water soluble amine groups are preferred.

Acids

The acids useful in this invention include acetic, phosphoric, hydrochloric, hydrobromic and sulfamic acid. The preferred acid is acetic.

The acid, while stated to be optional in the subject invention is required in all cases except where the emulsions are to be used with aggregate which is substantially all calcareous in nature. A higher pH is then required and the acid, otherwise required, can be eliminated. When present the acid will constitute from about 0.001 to about 0.5 percent by weight of the base emulsion, preferably about 0.003 to about 0.01 percent. A particularly preferred base emulsion will contain about 0.004 percent acetic acid. The base emulsions will have a pH in the range of from 5 to 8, preferably from 6 to 7.

Solvents

The solvents useful in the subject invention are volatile hydrocarbons such as kerosene, naphtha, and various grades of fuel oil. The solvents allow the emulsions to remain workable during winter months when temperatures drop. The solvents provide cutting power and provide long range workability.

Particularly preferred is kerosene which provides the best compromise between cutting power and long range workability.

Bitumens

Although the invention is illustrated in the present specification by examples which involve preparation and testing of emulsions of asphalt (since among emulsified bituminous materials, asphalt emulsions are most frequently used for road construction and repairs), emulsions of other bituminous materials, for instance, those of coal tar, pitch, and the like may be similarly formulated for use in this invention. It should be noted that penetration of the bitumen (asphalt) is not critical, and any bitumen capable of being emulsified may be used in accordance with the invention.

The following examples are offered by way of illustration and not by way of limitation. All parts are by weight unless otherwise specified.

MANUFACTURE OF BITUMEN BONDED-AGGREGATE SURFACES

The surfaces prepared using the modified emulsions of this invention can be constructed using conventional equipment used in the field. The amount of modified emulsion used will normally be in the range of from 6 to 10 parts by weight per 94 to 90 parts by weight of aggregate with a total of 100 parts in the mixture.

EXAMPLE 1 PREPARATION OF BASE EMULSIONS

A base emulsion (B-1) was prepared having a residue of 68.3 percent by weight by emulsifying in a colloid mill (1) 68 parts of an 85/100 penetration grade paving asphalt with a water phase which, based on the total emulsion, contained (2) 0.3 part of (Redicote E-11), (3) 0.004 part acetic acid, and (4) 31.7 parts water. The asphalt phase had a temperature of 275°–295°F. The pH of the emulsion water was 5.4 to 5.6. The base emulsion had a density of 8.52 pounds/gallon.

In a similar manner an emulsion (B-2) having a residue of 66.3 percent by weight was prepared by emulsifying (1) 66 parts of 160/180 penetration grade asphalt, with a water phase which, based on the total emulsion, contained (2) 0.3 part of Redicote E-11, (3) 0.004 part of acetic acid, and (4) 33.7 parts water in colloid mill. The asphalt phase had a temperature of 260°–270°F. The pH of the emulsion water was 5.4 to 5.6. The base emulsion had a density of 8.458 pounds/gallon.

EXAMPLE 2 PREPARATION OF MODIFIED EMULSIONS

To 89 parts of the first emulsion of Example 1 was added a mixture of 1 part Specialty AK, 10 parts kerosene (all parts based on total modified emulsion). The resultant modified emulsion (M-2) had a residue of 66.6 percent, a specific gravity of 0.995 and a pH of 5.5.

In a similar manner 84 parts of the second base emulsion of Example 1 was blended with 1 part of tall oil heads in 15 parts kerosene. The resultant modified emulsion (M-2) had a residue of 64.8, a specific gravity of 0.980, and a pH of 5.5.

EXAMPLE 3

Using modified emulsion M-2 of Example 2, 35 parts of the emulsion was mixed for 5 minutes with 465 parts of an aggregate comprised of sand, slag and limestone. (The aggregate contained 5 percent by weight moisture and had the gradation shown in Table II following.) Total coating was in excess of 90 percent and only slight stripping occurred. No significant wash-off occurred.

TABLE II

| Screen Size | Aggregate Gradation % By Weight Passing Corresponding Screen |
|---|---|
| ¾" | 100% |
| ½" | 95% |
| ⅜" | 74% |
| No. 4 | 58% |
| No. 8 | 35% |
| No. 16 | 27% |
| No. 30 | 18% |
| No. 50 | 8% |
| No. 100 | 3% |
| No. 200 | 2% |

Using the same emulsion as M-2 of Example 2 except that the tall oil was deleted (the emulsion had pH of 5.5), the same amount of the same type of aggregate was treated in the same manner. The sand portion of the aggregate was coated, but the slag portion of the aggregate was only partially coated. The limestone portion was only about 40% coated and stripping occurred after 15 seconds. No significant wash-off occurred.

EXAMPLE 4

A base emulsion was prepared having a pH of 4.5 and the composition set forth in Table III below:

TABLE III

| | |
|---|---|
| Asphalt, % by wt. | 68.0 |
| Ethoquad O/12, % by wt. | 0.3 |
| Acetic Acid, % by wt. | 0.1 |
| Water, % by wt. | 31.6 |

To 89 parts by weight of the base emulsion was added 1 part by weight of Crofatol P in 10 parts by weight of naphtha.

EXAMPLE 5

Seven parts by weight of the modified emulsion of Example 4 were mixed with 100 parts by weight of an aggregate made up of a 50/50 mixture by weight of Arundel Sand and limestone chips (¼–¾ inch) and 3 parts by weight water.

The total coating of the sand was greater than 95 percent. The limestone portion, however, was only 40 percent coated.

EXAMPLE 6

Using the same modified emulsion of Example 4 except that the acetic acid was omitted (the base emulsion had a pH of 7), the same aggregate as described in Example 5 was coated, using the same proportions of aggregate, wetting water and modified emulsion, in the same manner as set forth in Example 5.

The sand coating again exceeded 95 percent while the limestone chips were about 90 percent coated.

EXAMPLE 7

A base emulsion was prepared having a pH of 6.5 and the composition set forth in Table IV following:

TABLE IV

| | |
|---|---|
| Asphalt, % by wt. | 68.000 |
| Ethoquad O/12, % by wt. | 0.300 |
| Acetic Acid, % by wt. | 0.002 |
| Water, % by wt. | 31.698 |

To 89 parts by weight of the base emulsion was added 1 part by weight of Crofatol P in 10 parts by weight naphtha.

EXAMPLE 8

Eight parts by weight of the modified emulsion of Example 7 were mixed with 100 by weight of an aggregate having the make-up set forth in Table V below. (The aggregate contained 5% moisture by weight.)

TABLE V

| Gradation %, Passing | 50 Parts by Weight Sand | 50 Parts by Weight Grits (Limestone) |
|---|---|---|
| Screen | | |
| No. 4 | 100 | — |
| No. 6 | — | 100 |
| No. 7 | — | 90 |
| No. 8 | 88 | 65 |
| No. 9 | — | 40 |
| No. 14 | — | 5 |
| No. 16 | 67 | — |
| No. 30 | 47 | — |
| No. 50 | 22 | — |
| No. 100 | 7 | — |
| No. 200 | 1 | — |

The modified emulsion coated greater than 95% of the sand and 89–90 percent of the limestone grits.

It is apparent that many widely different embodiments of this invention may be made without departing from the scope and spirit thereof; and, therefore, it is not intended to be limited except as indicated in the appended claims.

I claim:

1. A modified emulsion consisting essentially of,
   a. from about 60 to about 100 parts by weight of a base emulsion having a pH of from about 5 to about 8, said base emulsion comprised of,
      a. from about 50 to about 80 parts by weight bitumen,
      b. from about 0.05 to about 2.0 parts by weight of a cationic emulsifier,
      c. from 0 to about 0.5 part by weight of an acid selected from the group consisting of acetic, phosphoric, hydrochloric, hydrobromic, and sulfamic, and
      d. sufficient water to make the total of (a), (b), (c), and (d) equal 100 parts by weight, and
   2. from about 0.25 to about 3.0 parts of an adhesion promoter selected from the class consisting of tall oil, crude tall oil, tall oil heads, and tall oil pitch in from 0 to about 30 parts of solvent.

2. claim 1 wherein said adhesion promoter is tall oil.
3. claim 2 wherein said acid is acetic acid.
4. claim 3 wherein said bitumen is asphalt present in an amount of from 55 to 70 parts by weight.
5. claim 4 wherein said solvent is present in an amount of from 10 to 20 parts by weight.
6. claim 5 wherein said tall oil is present in an amount of from 0.5 to 2 parts by weight.
7. claim 6 wherein said tall oil contains from about 10 to about 30 percent by weight rosin acid.
8. claim 6 wherein said tall oil is reconstituted crude tall oil having an acid number of 80, a rosin acid content of 24% by weight, 25% by weight of unsaponifiables, and a saponification number of 122.
9. claim 8 wherein said cationic emulsifier has the formula

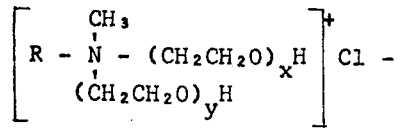

wherein R is an alkyl chain derived from oleic acid, $x$ = a whole number from 0–2, and $y$ = a whole number from 0–2, with the proviso that $y = 2-x$.

10. claim 7 wherein said acetic acid is present in an amount of about 0.004 part by weight and said base emulsion has a pH of from about 6 to about 7.
11. A method of preparing a bitumen bonded mixed aggregate surface comprising mixing
    A. from 6 to 10 parts by weight of a modified emulsion comprised of
       1. from about 60 to about 100 parts by weight of a base emulsion having a pH of from about 5 to about 8, said base emulsion comprised of, base
          a. from about 50 to about 80 parts by weight bitumen,
          b. from about 0.05 to about 2.0 parts by weight of a cationic emulsifier,
          c. from 0 to about 0.5 part by weight of an acid selected from the group consisting of acetic, phosphoric, hydrochloric, hydrobromic, and sulfamic, and
          d. sufficient water to make the total of (a), (b), (c), and (d) equal 100 parts by weight, and
       2. from about 0.25 to about 3.0 parts of an adhesion promoter selected from the class consisting of tall oil, crude tall oil, tall oil heads, and tall oil pitch in from 0 to about 30 parts of solvent with
    B. from 94 to 90 parts of a mixed aggregate containing both calcareous and siliceous material.

* * * * *